United States Patent [19]

Rooks et al.

[11] Patent Number: 4,760,696
[45] Date of Patent: Aug. 2, 1988

[54] FUEL SYSTEM FOR GAS TURBINE ENGINES

[75] Inventors: John V. Rooks, Derby; Russell A. Loxley, Leicester, both of England

[73] Assignee: Rolls-Royce plc, London, England

[21] Appl. No.: 889,958

[22] Filed: Jul. 28, 1986

[30] Foreign Application Priority Data

Sep. 4, 1985 [GB] United Kingdom ................. 8521993

[51] Int. Cl.$^4$ ............................................. F02C 9/26
[52] U.S. Cl. .................................... 60/39.281; 60/734
[58] Field of Search ................ 60/39.141, 39.281, 734, 60/39.27, 235

[56] References Cited

U.S. PATENT DOCUMENTS

| 3,126,942 | 3/1964 | Tyler | 60/39.281 |
| 3,858,390 | 1/1975 | Jansen et al. | 60/39.141 |
| 4,607,486 | 8/1986 | Cole | 60/734 |

*Primary Examiner*—Louis J. Casaregola
*Attorney, Agent, or Firm*—Cushman, Darby & Cushman

[57] ABSTRACT

The present invention is particularly concerned with the supply of fuel to fuel servos of gas turbine engines. A check valve (62) is positioned in a return pipe (40, 24, 22, 26) from a fuel spill valve (12) to the upstream low pressure side of a high pressure pump (10). An aperture (32) in a piston (30) of the check valve (62) produces a predetermined pressure drop across the check valve (62) when the flow of excess fuel reaches a predetermined value. A fuel servo shut off valve (64) is positioned in a pipe (42, 58) connecting a fuel flow regulator (14) to a fuel servo (80). A piston (46) of the fuel servo shut off valve (64) initially closes a chamber (56) to prevent fuel being supplied to the fuel servo (80), from the fuel flow regulator (14). The piston (46) of the fuel servo shut off valve (64) is moved against a spring (48) when the predetermined pressure drop is formed across the check valve (62) to allow fuel to be supplied from the fuel flow regulator (14) to the fuel servo (80) via chamber (56).

This arrangement allows the use of a smaller pump and reduces recirculation and temperature rises in the fuel at ground idle.

10 Claims, 5 Drawing Sheets

FUEL SYSTEM FOR GAS TURBINE ENGINES

The present invention relates to fuel systems for gas turbine engines and is particularly concerned with the supply of fuel to fuel servos.

The fuel systems of gas turbine engines comprise a low pressure pump which supplies fuel at a low pressure to a high pressure pump, which in turn supplies fuel at a high pressure to a fuel spill valve, a fuel flow regulator and fuel servos. The fuel flow regulator supplies fuel to a burner manifold and its associated fuel burners. The fuel servos use the fuel to drive accessories on the engine, or other devices, i.e., variable stator vanes. The fuel spill valve returns fuel, excess to requirement, to the low pressure upstream end of the high pressure pump.

The high pressure pump of these fuel systems is often a gear pump, and must be sized correctly. If the pump is too large then at engine idling conditions, in particular, the fuel required by the gas turbine engine is greatly exceeded by the high pressure pump flow. This results in a large return flow of fuel from the fuel spill valve to the upstream end of the high pressure pump, and this leads to a rise in the fuel temperature. It is important that the high pressure pump should not be sized too large, in order to minimise recirculation and temperature rise of the fuel at idle condition.

Accordingly the present invention provides a fuel system for a gas turbine engine having means for supplying low pressure fuel to a high pressure pump, the high pressure pump being adapted to supply high pressure fuel to a fuel flow regulator and a fuel spill valve, the fuel flow regulator being adapted to supply high pressure fuel to at least one fuel burner manifold and the associated fuel burners, the fuel spill valve being adapted to return excess fuel to the upstream low pressure side of the high pressure pump, the at least one fuel servo being adapted to be supplied with high pressure fuel from a position downstream of the high pressure pump control means sensing when the flow of excess fuel from the fuel spill valve to the upstream low pressure side of the high pressure pump reaches a predetermined value, the control means allowing the supply of high pressure fuel to the at least one fuel servo when the flow of excess fuel is greater than the predetermined value.

The control means may comprise a fuel servo shut off valve having a piston positioned within a first cylinder and defining with the first cylinder a first chamber and a second chamber, the second chamber having a spring positioned therein to act upon the piston, the end of the piston remote from the second chamber extending through an aperture in the first cylinder and through an aperture a second cylinder, the second cylinder defining a third chamber, the first chamber being connected to the low pressure side of the high pressure pump and the fuel spill valve, the second chamber being connected to a position in the fuel system having relatively low pressure fuel, the third chamber being adapted to control the flow of high pressure fuel to the at least one fuel servo, in operation the piston being moveable from a first position in which the spring urges the end of the piston remote from the second chamber into the third chamber to prevent the flow of high pressure fuel to the at least one fuel servo, to a position in which the end of the piston remote from the second chamber is moved out of the third chamber to allow the flow of high pressure fuel to the at least one fuel servo, the piston being moved against the spring when a predetermined pressure drop has been formed across the piston, the predetermined pressure drop overcoming the spring.

The control means may comprise a fuel servo shut off valve having a piston positioned within a cylinder and defining with the cylinder a first chamber, a second chamber and a third chamber, the second chamber having a spring positioned therein to act upon the piston, the end of the piston remote from the second chamber being urged into the third chamber by the spring, the first chamber being connected to the low pressure side of the high pressure pump and the fuel spill valve, the second chamber being connected to a position in the fuel system having relatively low pressure fuel, the third chamber being adapted to control the flow of high pressure fuel to the at least one fuel servo, in operation the piston being moveable from a first position in which the spring urges the end of the piston remote from the second chamber into the third chamber to prevent the flow of high pressure fuel to the at least one fuel servo to a position in which the end of the piston remote from the second chamber is moved out of the third chamber to allow the flow of high pressure fuel to the at least one fuel servo, the piston being moved against the spring when a predetermined pressure drop has been formed across the piston, the predetermined pressure drop overcoming the spring.

The control means may comprise a check valve having a piston positioned within a cylinder and defining with the cylinder a first chamber and a second chamber, the second chamber having a spring positioned therein to urge the piston onto a seat, the piston having an aperture of predetermined size to interconnect the first and second chambers, the first chamber being connected to the fuel spill valve and the first chamber of the fuel servo shut off valve, the second chamber being connected to the position in the fuel system having relatively low pressure fuel and the second chamber of the fuel servo shut off valve, the position in the fuel system having relatively low pressure fuel is the upstream low pressure side of the high pressure pump, in operation the flow of excess fuel from the fuel spill valve to the upstream low pressure side of the high pressure pump flows through the first chamber, the aperture in the piston and the second chamber of the check valve, the aperture of the piston being of predetermined size to produce the predetermined pressure drop across the check valve when the flow of excess fuel reaches a predetermined value, the predetermined pressure drop across the check valve causes the piston in the fuel servo shut off valve to move to allow the supply of high pressure fuel to the at least one fuel servo.

The fuel flow regulator may supply high pressure fuel to the at least one fuel servo via the third chamber of the fuel servo shut off valve.

The spring in the second chamber of the check valve is chosen to allow the piston in the check valve to move off its seat to limit the pressure rise in the first chamber of the check valve.

The area of the end of the piston remote from the second chamber of the fuel servo shut off valve is chosen so that when the engine is running at high speeds the pressure of the high pressure fuel is great enough to maintain the flow of high pressure fuel to the at least one fuel servo even though the flow of excess fuel from the fuel spill valve to the upstream low pressure side of the high pressure pump falls below the predetermined value.

The control means may comprise a check valve having a piston positioned within a cylinder and defining with the cylinder a first chamber and a second chamber, the second chamber having a spring positioned therein to urge the piston onto a seat, the piston having an aperture of predetermined size to interconnect the first and second chambers, the first chamber being connected to the fuel spill valve and the first chamber of the fuel servo shut off valve, the second chamber being connected to the downstream high pressure side of the low pressure pump, the position in the fuel system having relatively low pressure fuel is the upstream low pressure side of the low pressure pump, in operation the flow of excess fuel from the fuel spill valve to the downstream high pressure side of the low pressure pump flows through the first chamber, the aperture in the piston and the second chamber of the check valve, the aperture of the piston being of predetermined size to produce the predetermined pressure drop across the check valve when the flow of excess fuel reaches a predetermined value, the predetermined pressure drop across the check valve causes the piston in the fuel servo shut off valve to move to allow the supply of high pressure fuel to the at least one fuel servo.

The fuel flow regulator may supply high pressure fuel to the at least one fuel servo, the third chamber of the fuel servo shut off valve interconnecting the at least one fuel servo and the high pressure side of the low pressure pump to control the flow of high pressure fuel from the fuel flow regulator to the at least one fuel servo.

The area of the end of the piston remote from the second chamber of the fuel servo shut off valve is chosen so that when the engine is running at high speeds the pressure of the fuel at the downstream high pressure side of the low pressure pump is great enough to maintain the flow of high pressure fuel to the at least one fuel servo even though the flow of excess fuel from the fuel spill valve to the upstream low pressure side of the high pressure pump falls below the predetermined value.

The present invention will be more fully described with reference to the accompanying drawings in which.

Figure 4:
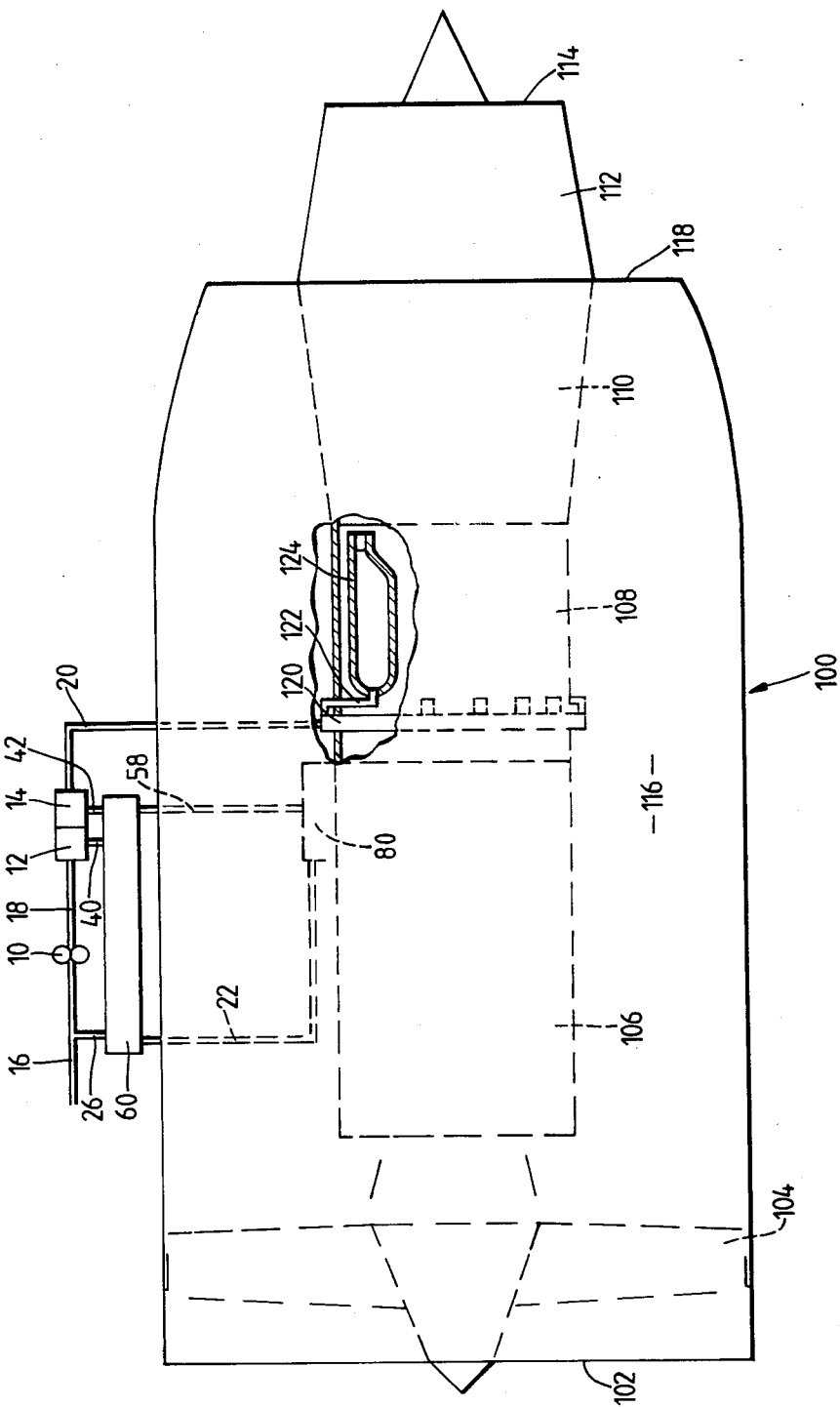
FIG. 4 shows a gas turbine engine with a fuel system according to the present invention.

A gas turbine engine of the turbofan type 100 is shown in FIG. 4 and comprises in flow series an inlet 102, a fan 104, a compressor 106, a combustion system 108, a turbine 110 an exhaust nozzle 112 and an exit 114. A fan duct 116 surrounds the gas generator and has an exit 118. The combustion system 108 comprises an annular combustion chamber 124, and a plurality of fuel burners 122 are located at the upstream end of the combustion chamber 124 to supply fuel into the combustion chamber 124. Each of the fuel burners 122 is supplied with fuel from a fuel manifold 120. Fuel is supplied from a low pressure supply of fuel to a high pressure pump 10 via a pipe 16, and the high pressure pump 10 then supplies high pressure fuel to a fuel spill valve 12 and a fuel flow regulator 14 via a pipe 18. The fuel flow regulator 14 supplies high pressure fuel to the fuel burner manifold 120 via a pipe 20, and supplies high pressure fuel to fuel servos 80 via a pipe 42, a control device 60 and a pipe 58. Excess fuel to burner requirement is returned to the low pressure upstream side of the high pressure pump 10 by the fuel spill valve 12 via pipe 40, control device 60 and pipe 26. Fuel is returned from the fuel servos 80 to the low pressure upstream side of the high pressure pump 10 via pipes 22 or 24, control device 60 and pipe 26.

Figure 1:
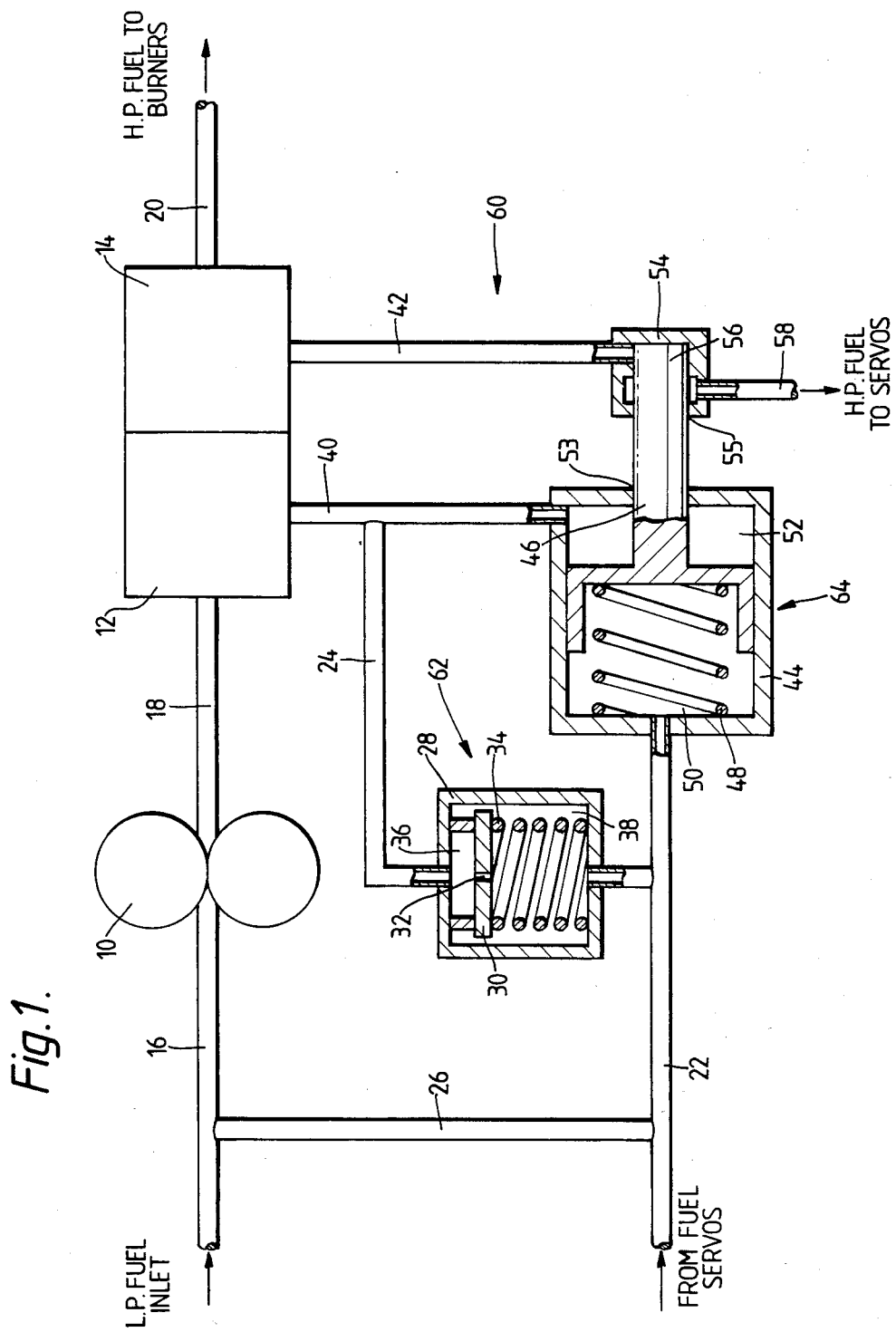
FIG. 1 shows a fuel system for a gas turbine engine according to the present invention.
Figure 2:
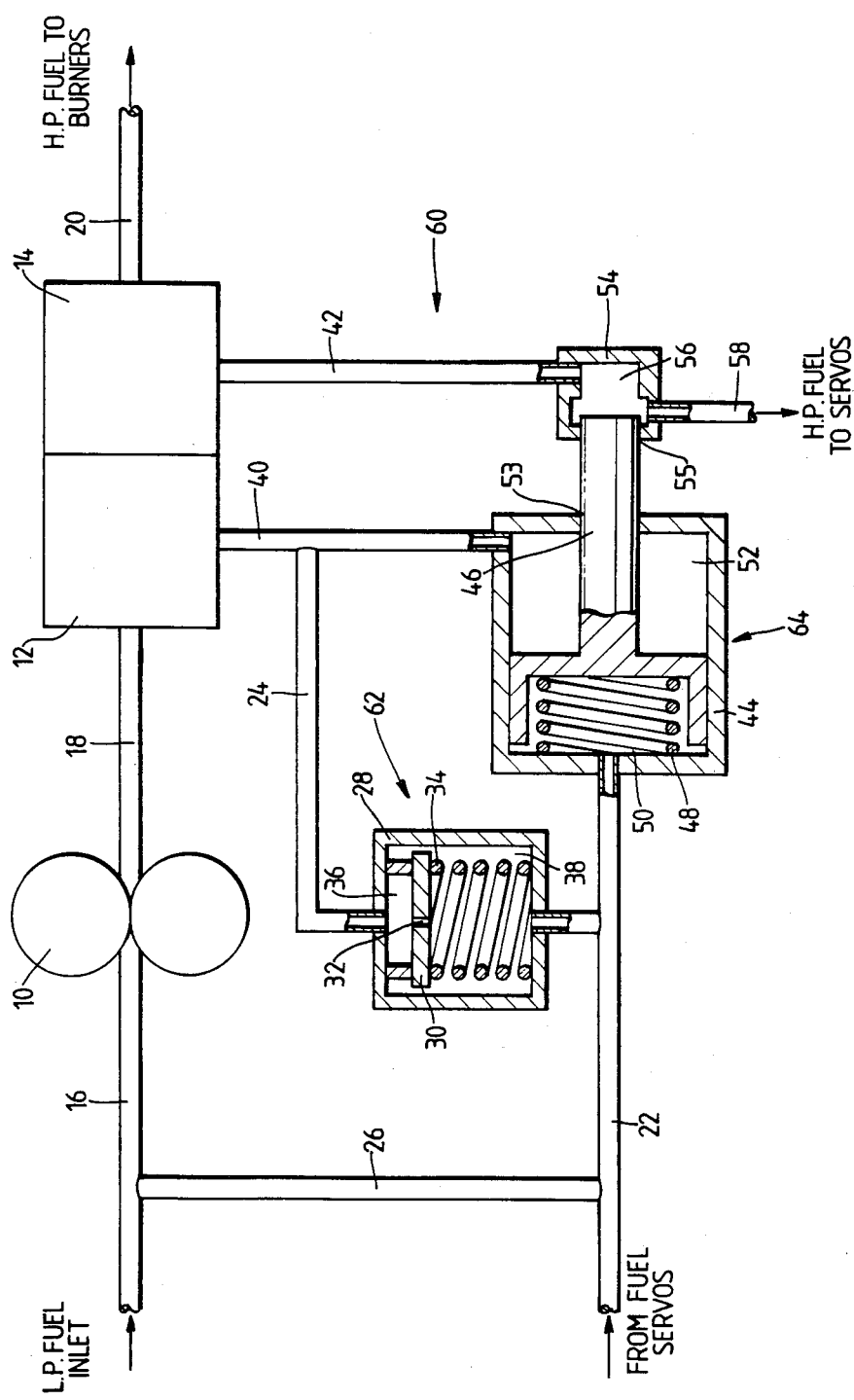
FIG. 2 shows the fuel system in FIG. 1 in a second position.

The fuel system is shown more clearly in FIGS. 1 and 2. The control device 60 comprises a check valve 62 and a fuel servo shut off valve 64. The check valve 62 comprises a piston 30 contained within a cylinder 28 and defining with the cylinder 28 two chambers 36 and 38. A spring 34 is located within chamber 38 and urges the piston 30 against its seat, chamber 38 is connected to the pipe 22, and the chamber 36 is connected to pipe 40 by a pipe 24. The piston 30 has an aperture 32 which interconnects chambers 36 and 38 and the size of aperture 32 is chosen to produce a predetermined pressure drop. Pipe 22 is also connected to the pipe 16 at the upstream low pressure side of the high pressure pump 10 by pipe 26. The pipe 22 is connected to the fuel servos 80 and conveys fuel from the fuel servos 80 to the upstream low pressure side of the high pressure pump 10.

The fuel servo shut off valve 64 comprises a piston 46 contained within a first cylinder 44 and defining with the first cylinder 44 two chambers 50 and 52. A spring 48 is located within chamber 50 which is connected to pipe 22, and the chamber 52 is connected to pipe 40. The end of the piston 46 remote from chamber 50 extends through an aperture 53 in the first cylinder 44 and through an aperture 55 in a second cylinder 54. The cylinder 54 defines a chamber 56 which is connected to the fuel flow regulator 14 via pipe 42, and the fuel servos 80 via pipe 58.

The gas turbine engine 100 is initially at rest. During the starting procedure the check valve 62 and the fuel servo shut off valve 64 are in the positions shown in FIG. 1, in which low pressure fuel from the low pressure fuel supply is delivered to the high pressure pump 10 via pump 16. The high pressure pump 10 then supplies high pressure fuel to the fuel spill valve 12 and the fuel flow regulator 14. The fuel flow regulator 14 in turn supplies high pressure fuel to the fuel burner manifold 120 and fuel burners 122 via the pipe 20. The fuel flow regulator 14 also supplies high pressure fuel along pipe 42 to chamber 56 in the second cylinder 54 of the fuel servo shut off valve 64.

The piston 46 in the cylinder 44 of the fuel servo shut off valve 64 is acted upon by the spring 48 in chamber 50 to position the end of the piston 46 remote from the chamber 50 within the chamber 56 of the second cylinder 54 so that high pressure fuel supplied along pipe 42 from the fuel flow regulator 14 is not supplied via chamber 56 and pipe 58 to the fuel servos 80.

Any excess fuel is returned to the low pressure upstream side of the high pressure pump 10 by the fuel spill valve 12 via pipes 40, 24 and chamber 36, aperture 32 and chamber 38 of the check valve 62, and pipes 22 and 26. Excess fuel is also supplied into chamber 52 of the fuel servo shut off valve 64, but during starting procedure of the gas turbine engine 100 the pressure drop generated across the check valve 62, due to the flow of excess fuel and the size of the aperture 32 in the piston 30, is insufficient to overcome the spring 48 in chamber 50 of the fuel servo shut off valve 64.

Once the engine has started and the high pressure pump 10 capacity has increased, the flow of excess fuel returning to the upstream side of the high pressure pump 10 increases. The check valve 62 is used to sense that there is a flow of excess fuel from the fuel spill valve 12 of sufficient magnitude to supply the fuel servos 80. As the flow of excess fuel increases, the pressure difference formed across the check valve 62 gradually increases because of the restriction of flow due to the aperture 32 in the piston 30. The aperture 32 is of a predetermined size so that, at a suitable condition between starting and the minimum condition at which the fuel servos 80 require fuel, the flow of excess fuel will generate a pressure drop across the aperture 32 sufficient to overcome the spring 48 in chamber 50 of the fuel servo shut off valve 64. The check valve 62 and the fuel servo shut off valve 64 are then in the positions shown in FIG. 2. The fuel flow regulator 14 now supplies high pressure fuel to the fuel servos 80 via pipe 42, the chamber 56 in cylinder 54 of the fuel servo shut off valve 64 and pipe 58. Fuel from the fuel servos 80 is returned to the low pressure upstream side of the high pressure pump 10 via pipes 22 and 26.

If the flow of excess fuel from the fuel spill valve 12 to the low pressure upstream side of the high pressure pump 10 becomes very large, the pressure drop across the aperture 32 continues to increase until the piston 30 moves off its seat, i.e., the pressure difference overcomes the spring 34. The pressure drop is then limited and the overall system pressure level does not continue to rise unnecessarily.

At very high engine speeds it is likely that the high pressure pump 10 may be operating very close to its maximum capacity, i.e., the pump capacity is very close to the fuel requirement of the fuel burners. In this case the flow of excess fuel from the fuel spill valve 12 will be low, as at starting, but at high engine speeds it is important to maintain a fuel flow to the fuel servos 80.

The fuel servo shut off valve 64 is arranged so that at very high engine speeds the end of the piston 46 remote from chamber 50 is subjected to high pressure fuel flowing from the fuel flow regulator 14 to the fuel servos 80 via pipe 42, chamber 56 and pipe 58. The pressure of the high pressure fuel in chamber 56 and the area of the end of the piston remote from the chamber 50 is chosen to keep the piston 46 in the position shown in FIG. 2 to allow high pressure fuel to flow to the fuel servos 80.

At the starting condition the pressure of the high pressure fuel from the fuel flow regulator 14 to cylinder 54 is insufficient to open the fuel servo-shut-off valve 64.

At very low excess fuel flows from the fuel spill valve 12 to the low pressure upstream side of the high pressure pump 10 at a magnitude where the excess fuel flow is insufficient to supply the fuel servos 80, the check valve 62 senses the flow of excess fuel is insufficient because the pressure drop generated across the aperture 32 in the piston 30 is insufficient to overcome the spring 48.

The fuel system of the invention allows the high pressure pump to be sized appropriately in order to minimise recirculation and temperature rise of the fuel at engine idle conditions.

The fuel system of the present invention senses that there is an excess fuel flow of predetermined magnitude from the fuel spill valve, which is sufficient to supply the fuel servos. Should the excess fuel flow fall below the predetermined magnitude, as at starting, the supply of fuel to the fuel servos is automatically stopped by the fuel servo shut off valve. If the excess fuel flow falls to zero at high engine speeds, the high pressure fuel maintains the fuel servo shut off valve in the open position.

Figure 3:
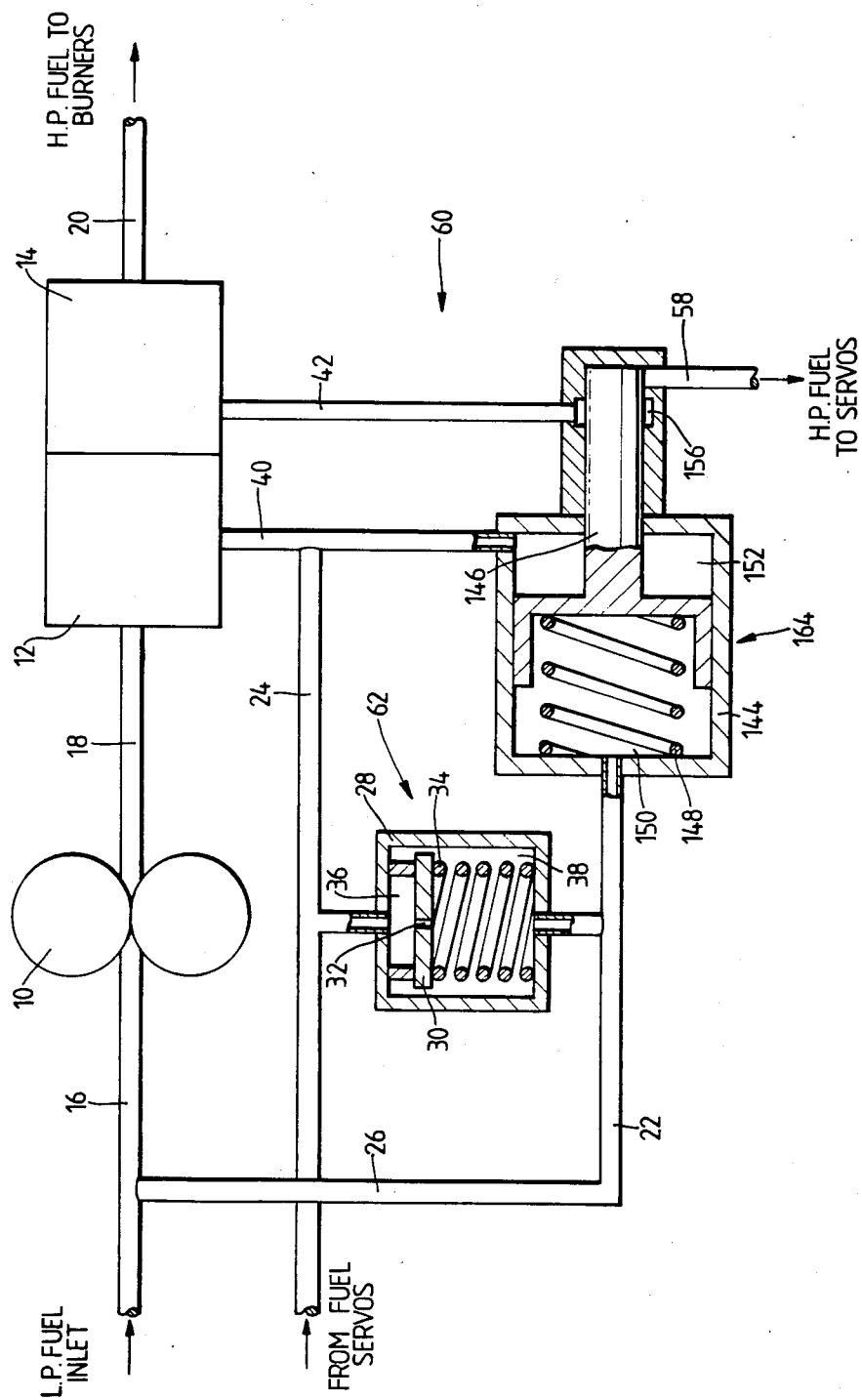
FIG. 3 shows an alternative embodiment of a fuel system according to the present invention.

The embodiment in FIG. 3 is similar to that in FIGS. 1 and 2 but gives a snap action to the switch over point. The check valve 62 is identical to that in FIGS. 1 and 2 and like parts are denoted by like numerals. The fuel servo shut off valve 164 comprises a piston 146 contained within a cylinder 144 and defining with the cylinder 144 three chambers 150, 152 and 156. A spring 148 is located in chamber 150 which is connected to pipe 22, and the chamber 152 is connected to pipe 40. The end of the piston 146 remote from chamber 150 is urged into chamber 156 by the spring 148. The chamber 156 is connected to the fuel flow regulator 14 via pipe 42, and the fuel servo 80 via pipe 58. The fuel servo shut off valve 164 works similarly to that in FIGS. 1 and 2, and will not be discussed again, also fuel from the fuel servos is returned by pipe 24.

Figure 5:
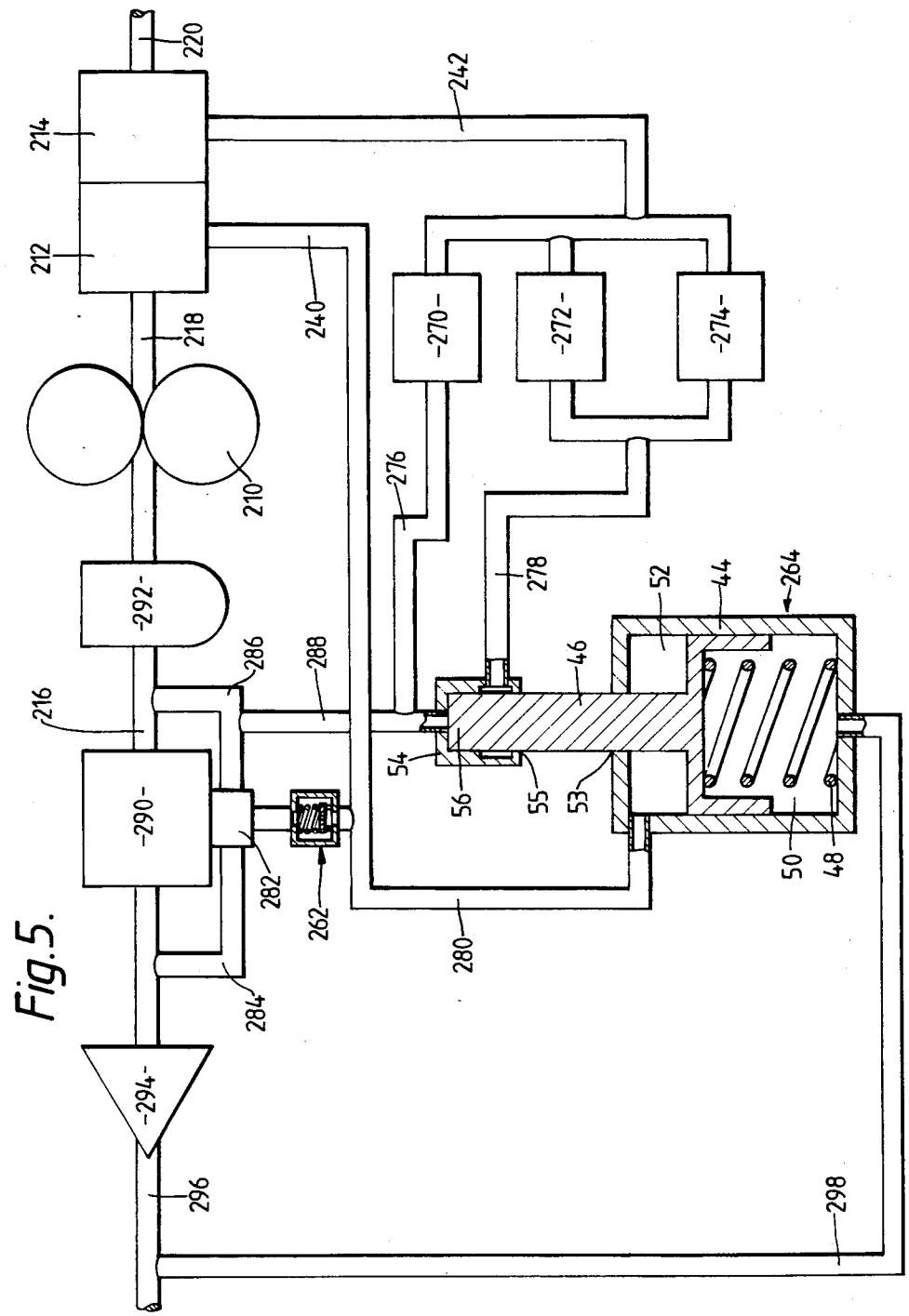
FIG. 5 shows an alternative embodiment of a fuel system according to the present invention.

The embodiment in FIG. 5 shows a high pressure pump 210, which is supplied with fuel from a low pressure pump 294 via a fuel cooled oil cooler 290, a filter 292 and a pipe 216. The high pressure pump 210 supplies high pressure fuel to a fuel spill valve 212, and a fuel flow regulator 214 via a pipe 218. The fuel flow regulator 214 supplies high pressure fuel to the fuel burner manifold 220, and also supplies high pressure fuel to fuel servos 270, 272 and 274 via a pipe 242. Excess fuel to burner requirement is returned to the low pressure upstream side of the high pressure pump 210 by the fuel spill valve 212 via pipe 240 to a check valve 262 and a diverter valve 282 which returns the excess fuel to either the upstream or downstream side of the fuel cooled oil cooler 290, through pipes 284, 286 respectively. The fuel servos 270, 272 and 274 return fuel to the low pressure upstream side of the high pressure pump 210, in this example via the pipe 286 to pipe 216.

The fuel servo 270, which is a booster stage feed valve, returns fuel directly through pipes 276, 288 and 286 to pipe 216, and the fuel servos 272 and 274, which drive variable stator vanes and other engine accessories, return fuel through pipe 278 and via fuel servo shut off valve 264 to join fuel flowing from fuel servo 270 through pipes 288 and 286 to pipe 216.

The fuel servo shut off valve 264 is similar to that shown in FIGS. 2 and 3 and like parts are denoted by like numerals. The return pipe 240 from the fuel spill valve 212 also interconnects with the chamber 52 of the fuel servo shut off valve 264 via pipe 280, and a pipe 298 interconnects chamber 50 of the fuel servo shut off valve 264 with a pipe 296 supplying fuel to the low pressure upstream side of the low pressure pump 294. The pipe 278 connects the fuel servos 272 and 274 with chamber 56 of the fuel servo shut off valve 264, and pipe 288 connects chamber 56 to pipe 216.

The check valve 262 is identical to that shown in FIGS. 1 to 3, the piston of the check valve has an aperture of predetermined size to produce a predetermined drop across the piston, when the flow of excess fuel from the fuel spill valve is sufficient to supply the fuel servos. The pressure drop being sufficient to overcome the spring in the fuel servo shut off valve. The check valve and diverter valve could be arranged as a single unit, rather than the two separate units shown in FIG. 5.

During the starting procedure the fuel servo shut off valve 264 is in the position shown in FIG. 5, in which low pressure fuel is supplied to the high pressure pump 210, by the low pressure pump 294 via the fuel cooled oil cooler 290 and the filter 292. The high pressure pump 210 supplies high pressure fuel to the fuel flow regulator 214, and the fuel spill valve 212. The major quantity of the high pressure fuel is supplied to the fuel burner manifold and fuel burners through pipe 220, because the fuel servo shut off valve 264 is closed.

The fuel returning along pipe 240 is insufficient to cause the pressure in chamber 52 to overcome the pressure of fuel in chamber 50, and the spring force, and the pressure rise across the low pressure pump 294 at low speeds is also insufficient to overcome the pressure of fuel in chamber 50 and the spring force.

The fuel servo 270 is supplied with fuel at all times by the fuel flow regulator, but the fuel servos 272 and 274 are only supplied with fuel when the fuel servo shut off valve is open.

Once the engine has started the flow of excess fuel returning to the upstream side of the high pressure pump increases. As this flow increases the pressure of fuel in chamber 52 increases because of the check valve and overcomes the pressure of the fuel in chamber 50 and the spring 48, to move the piston 46 and allow high pressure fuel to the fuel servos 272 and 274. The diverter valve 282 may then open to release the excess fuel to pipe 216.

At very high engine speeds the flow of excess fuel through pipe 240 is low, and is insufficient to keep the fuel servo shut off valve open, but the fuel servo shut off valve remains open because the pressure rise across the low pressure pump at high speeds is sufficient to keep it open. The output from the low pressure pump 294 acts through pipes 286 and 288 upon the end of the piston 46 remote from chamber 50 which is of a chosen small area to increase any force.

In FIGS. 1 to 3 the fuel servo shut off valve is positioned in flow series between the high pressure pump and the fuel servos. Excess fuel from the fuel servos being returned to the upstream low pressure side of the high pressure pump. In FIG. 5 the fuel servo shut off valve is positioned in flow series after the high pressure pump and the fuel servos. Excess fuel from the fuel servos being returned via the fuel servo shut off valve to the upstream low pressure side of the high pressure pump. In FIG. 5 once the fuel has been supplied to the fuel servos it is at a lower pressure, this makes it necessary to use the pressure difference across the low pressure pump to keep the fuel servo shut off valve open at high engine speeds.

These embodiments make it possible to use a high pressure pump of minimum size.

Although the body of the description has referred to the fuel servos being supplied with high pressure fuel from the fuel flow regulator it would be within the scope of the invention to supply high pressure fuel to the fuel servos from any position between the high pressure pump outlet and the fuel flow regulator.

We claim:

1. A fuel system for a gas turbine engine having a high pressure pump, a means for supplying low pressure fuel to the high pressure pump, a fuel flow regulator, a fuel spill valve, at least one fuel burner manifold and at least one fuel servo, a fluid flow line interconnecting the high pressure pump and the fuel flow regulator and a fluid flow line interconnecting the high pressure pump and the fuel spill valve for supplying high pressure fuel from the high pressure pump to the fuel flow regulator and the fuel spill valve, respectively, a fluid flow line interconnecting the fuel flow regulator and the at least one fuel burner manifold for supplying high pressure fuel from the fuel flow regulator to the at least fuel burner manifold and the associated fuel burners, a fluid flow line interconnecting the fuel spill valve to the upstream low pressure side of the high pressure pump for returning excess fuel from the fuel spill valve to the upstream low pressure side of the high pressure pump, a fluid flow line interconnecting the at least one fuel servo and a point downstream of the high pressure pump for supplying the at least one fuel servo with high pressure fuel from downstream of the high pressure pump, control means for sensing when the flow of excess fuel from the fuel spill valve to the upstream low pressure side of the high pressure pump reaches a predetermined value, the control means allowing the supply of high pressure fuel to the at least one fuel servo when the flow of excess fuel is greater than the predetermined value.

2. A fuel system for a gas turbine engine as claimed in claim 1 in which the control means comprises a fuel servo shut off valve having a piston positioned within a first cylinder and defining with the first cylinder a first chamber and a second chamber, the second chamber having a spring positioned therein to act upon the piston, the end of the piston remote from the second chamber extending through an aperture in the first cylinder and through an aperture in a second cylinder, the second cylinder defining a third chamber, the first chamber being connected to the low pressure side of the high pressure pump and the fuel spill valve, the second chamber being connected to a position in the fuel system having relatively low pressure fuel, the third chamber including means for controlling the flow of fuel to the at least one fuel servo, in operation the piston being moveable from a first position in which the spring urges the end of the piston remote from the second chamber into the third chamber to prevent the flow of high pressure fuel to the at least one fuel servo to a position in which the end of the piston remote from the second chamber is moved out of the third chamber to allow the flow of high pressure fuel to the at least one fuel servo, the piston being moved against the spring when a predetermined pressure drop has been formed across the piston, the predetermined pressure drop overcoming the spring.

3. A fuel system for a gas turbine engine as claimed in claim 1 in which the control means comprises a fuel servo shut off valve having a piston positioned within a cylinder and defining with the cylinder a first chamber, a second chamber and a third chamber, the second chamber having a spring positioned therein to act upon the piston, the end of the piston remote from the second chamber being urged into the third chamber by the spring, the first chamber being connected to the low pressure side of the high pressure pump and the fuel spill valve, the second chamber being connected to a position in the fuel system having relatively low pressure fuel, the third chamber including means for controlling the flow of fuel to the at least one fuel servo, in operation the piston being moveable from a first position in which the spring urges the end of the piston remote from the second chamber into the third chamber to prevent the flow of high pressure fuel to the at least one fuel servo to a position in which the end of the piston remote from the second chamber is moved out of the third chamber to allow the flow of high pressure fuel to the at least one fuel servo, the piston being moved against the spring when a predetermined pressure drop has been formed across the piston, the predetermined pressure drop overcoming the spring.

4. A fuel system for a gas turbine engine as claimed in claim 2 in which the control means comprises a check valve having a piston positioned within a cylinder and defining with the cylinder a first chamber and a second chamber, the second chamber having a spring positioned therein to urge the piston onto a seat, the piston having an aperture of predetermined size to interconnect the first and second chambers, the first chamber being connected to the fuel spill valve and the first chamber of the fuel servo shut off valve, the second chamber being connected to the position in the fuel system having relatively low pressure fuel and the second chamber of the fuel servo shut off valve, the position in the fuel system having relatively low pressure fuel is the upstream low pressure side of the high pressure pump, in operation the flow of excess fuel from the fuel spill valve to the upstream low pressure side of the high pressure pump flows through the first chamber, the aperture in the piston and the second chamber of the check valve, the aperture of the piston being of predetermined size to produce the predetermined pressure drop across the check valve when the flow of excess fuel reaches a predetermined value, the predetermined pressure drop across the check valve causes the piston in the fuel servo shut off valve to move to allow the supply of high pressure fuel to the at least one fuel servo.

5. A fuel system for a gas turbine engine as claimed in any of claims 2–4 in which the fuel flow regulator supplies high pressure fuel to the at least one fuel servo via the third chamber of the fuel servo shut off valve.

6. A fuel system for a gas turbine engine as claimed in claim 4 in which the spring in the second chamber of the check valve is chosen to allow the piston in the check valve to move off its seat to limit the pressure rise in the first chamber of the check valve.

7. A fuel system for a gas turbine engine as claimed in claim 5 in which the area of the end of the piston remote from the second chamber of the fuel servo shut off valve is chosen so that when the engine is running at high speeds the pressure of the high pressure fuel is great enough to maintain the flow of high pressure fuel to the at least one fuel servo even though the flow of excess fuel from the fuel spill valve to the upstream low pressure side of the high pressure pump falls below the predetermined value.

8. A fuel system for a gas turbine engine as claimed in claim 2 or claim 3 in which the control means comprises a check valve having a piston positioned within a cylinder and defining with the cylinder a first chamber and a second chamber, the second chamber having a spring positioned therein to urge the piston onto a seat, the piston having an aperture of predetermined size to interconnect the first and second chamber, the first chamber being connected to the fuel spill valve and the first chamber of the fuel servo shut off valve, the second chamber being connected to the downstream high pressure side of a low pressure pump, the position in the fuel system having relatively low pressure fuel is the upstream low pressure side of the low pressure pump, in operation the flow of excess fuel from the fuel spill valve to the downstream high pressure side of the low pressure pump flows through the first chamber the aperture in the piston and the second chamber of the check valve, the aperture of the piston being of predetermined size to produce the predetermined pressure drop across the check valve when the flow of excess fuel reaches a predetermined value, the predetermined pressure drop across the check valve causes the piston in the fuel servo shut off valve to move to allow the supply of high pressure fuel to the at least one fuel servo.

9. A fuel system for a gas turbine engine as claimed in claim 2 in which the fuel flow regulator supplies high pressure fuel to the at least one fuel servo, the third chamber of the fuel servo shut off valve interconnecting the at least one fuel servo and the low pressure side of the high pressure pump to control the flow of high pressure fuel from the fuel flow regulator to the at least one fuel servo.

10. A fuel system for a gas turbine engine as claimed in claim 9 in which the area of the end of the piston remote from the second chamber of the fuel servo shut off valve is chosen so that when the engine is running at high speeds the pressure of the fuel at the downstream high pressure side of the low pressure pump is great enough to maintain the flow of high pressure fuel to the at least one fuel servo even though the flow of excess fuel from the fuel spill valve to the upstream low pressure side of the high pressure pump falls below the predetermined value.

* * * * *

UNITED STATES PATENT AND TRADEMARK OFFICE
CERTIFICATE OF CORRECTION

PATENT NO. : 4,760,696

DATED : August 2, 1988

INVENTOR(S) : ROOKS and LOXLEY

It is certified that error appears in the above-identified patent and that said Letters Patent is hereby corrected as shown below:

Column 8, line 3, after "least", insert --one--.

Signed and Sealed this

Fourteenth Day of March, 1989

Attest:

DONALD J. QUIGG

*Attesting Officer*  *Commissioner of Patents and Trademarks*